United States Patent
Carmel et al.

(10) Patent No.: US 10,674,158 B2
(45) Date of Patent: Jun. 2, 2020

(54) METHOD AND SYSTEM OF VIDEO CODING OPTIMIZATION

(71) Applicant: BEAMR IMAGING LTD., Tel Aviv (IL)

(72) Inventors: Sharon Carmel, Ramat Hasharon (IL); Dror Gill, Haifa (IL); Tamar Shoham, Netanya (IL); Amir Leibman, Netanya (IL); Nikolay Terterov, St. Petersburg (RU); Pavel Titkov, St. Petersburg (RU); Alexander Zheludkov, St. Petersburg (RU)

(73) Assignee: BEAMR IMAGING LTD, Tel-Aviv (IL)

( * ) Notice: Subject to any disclaimer, the term of this patent is extended or adjusted under 35 U.S.C. 154(b) by 0 days.

(21) Appl. No.: 15/623,965

(22) Filed: Jun. 15, 2017

(65) Prior Publication Data

US 2018/0367799 A1    Dec. 20, 2018

(51) Int. Cl.
*H04N 19/00* (2014.01)
*H04N 19/146* (2014.01)
(Continued)

(52) U.S. Cl.
CPC ......... *H04N 19/146* (2014.11); *H04N 19/103* (2014.11); *H04N 19/172* (2014.11); *H04N 19/192* (2014.11); *H04N 19/50* (2014.11)

(58) Field of Classification Search
CPC ...... H03M 13/23; H03M 13/39; H03M 13/41; H03M 13/413; H03M 13/6502;
(Continued)

(56) References Cited

U.S. PATENT DOCUMENTS 7,995,649 B2 * 8/2011 Zuo ...................... H04N 19/176
375/240.01
8,031,777 B2 * 10/2011 Haskell ................ H04N 19/196
375/240
(Continued)

FOREIGN PATENT DOCUMENTS

WO    2016/120871    8/2016
WO    2016/142931    9/2016

OTHER PUBLICATIONS

KKarczewicz (A Hybrid Video Codec Based on Extended Block Sizes, Recursive Integer Transforms, Improved Interpolation, and Flexible Motion Representation; Proc. SPIE 7882, Visual Information Processing and Communication II, 788203; Jan. 31, 2011.*
Luo et al. H.264/Advanced Video Control Perceptual Optimization Coding Based on JND-Directed Coefficient Suppression; IEEE Transactions on Circuits and Systems for Video Technology, Vol. 23, No. 6, Jun. 2013.*
(Continued)

*Primary Examiner* — Frank F Huang
(74) *Attorney, Agent, or Firm* — Browdy and Neimark, PLLC

(57) ABSTRACT

There is provided a computerized method and system of optimized video encoding of an input video sequence corresponding to a plurality of input frames, the method comprising: obtaining an input frame; performing a first encoding of the input frame using a first encoding parameter determined in accordance with a target bit-rate, giving rise to a first encoded frame; performing a second encoding of the input frame using an iterative quality-driven encoding scheme initialized with an initial second encoding parameter, the initial second encoding parameter determined based on the first encoding parameter, the second encoding performed in an attempt to seek a second encoded frame having a lower bit-rate than the first encoded frame and meeting a quality criterion relative to the first encoded frame; and in case of the second encoded frame being found, providing the
(Continued)

second encoded frame as an output frame corresponding to the input frame.

41 Claims, 4 Drawing Sheets

(51) Int. Cl.
    *H04N 19/50*     (2014.01)
    *H04N 19/192*     (2014.01)
    *H04N 19/172*     (2014.01)
    *H04N 19/103*     (2014.01)

(58) Field of Classification Search
    CPC ... H04L 1/0053; H04L 1/0054; H04L 1/0059; H04L 1/0072; H04L 1/08; H04N 19/176; H04N 19/61; H04N 19/124; H04N 19/14; H04N 19/137
    See application file for complete search history.

(56) References Cited

U.S. PATENT DOCUMENTS

| | | | |
|---|---|---|---|
| 8,130,828 B2* | 3/2012 | Hsu | H04N 19/126 348/27 |
| 8,175,167 B2* | 5/2012 | Bouton | H04N 19/15 375/240.01 |
| 9,491,464 B2 | 11/2016 | Carmel et al. | |
| 2014/0211859 A1* | 7/2014 | Carmel | H04N 19/124 375/240.26 |
| 2014/0355668 A1 | 12/2014 | Carmel et al. | |

OTHER PUBLICATIONS

Apple's Technical Note TN2224, retreieved from: https://developer.apple.com/library/content/technotes/tn2224/_index. html (Aug. 2, 2016).
Ozer, Jan, "Video Encoding by Numbers", Doceo Publishing, 2016, pp. 311-312.
Anne Aaron, Zhi Li, Megha Manohara, Jan De Cock and David Ronca, Netflix, "Per-Title Encode Optimization", The Netflix Tech Blog, Dec. 14, 2015.
Michele Covell, Martin Arjovsky, Yao-Chung Lin and Anil Kokaram, "Optimizing transcoder quality targets using a neural network with an embedded bitrate model", Proceedings of the Conference on Visual Information Processing and Communications 2016, San Francisco.
Zhi Li, Anne Aaron, Ioannis Katsavounidis, Anush Moorthy and Megha Manohara, "Toward a Practical Perceptual Video Quality Metric", The Netflix Tech Blog, Jun. 6, 2016.
Wang, Z., Bovik, A. C., Sheikh, H. R., & Simoncelli, E. P. (2004). "Image Quality Assessment: From Error Visibility to Structural Similarity". IEEE transactions on image processing, 13(4), 600-612.
"The Case for Content-Adaptive Optimization", Whitepaper—Beamr, Mar. 2016.
Gil, Dror "Content Adaptive Encoding Approaches for Improved Video Quality at Reduced Bitrates", presented on Apr. 24, 2017 at the 'National Association of Browdcasters' NABshow, Broadcasting Engineering and Information Technology Conference, p. 180-185.
Diagram "Beamr Content Adaptive System". presented on Apr. 24, 2017 at the 'National Association of Browdcasters' NABshow.

* cited by examiner

METHOD AND SYSTEM OF VIDEO CODING OPTIMIZATION

TECHNICAL FIELD

The presently disclosed subject matter relates, in general, to the field of video encoding systems, and, more particularly, to video encoding configuration and optimization.

BACKGROUND

With the proliferation of viewing platforms, file formats and streaming technologies competing in today's online media ecosystem, today's networks are more congested with video than ever. This is mainly due to two factors: the quality expectations of consumers, which drives resolution and bitrates higher, and the sheer amount of video that crosses the network, driven by the shift to Over The Top (OTT) streaming of video, and video consumption in mobile devices.

Video encoding has been widely deployed in many applications and equipment, ranging from digital cinema, mobile handsets, cable and satellite digital video transmissions, to machine vision and recognition systems, etc. To counter the trend of network congestion, the goal of video encoding is often to create an encoded video which has maximal quality and best user experience, while making an effort to reduce video bitrates, given a set of limited resources such as total bandwidth, computation power etc. Some of the currently available video encoders may focus on encoding at a certain bit-rate without considering the encoded video quality, whereas some others may target at achieving a given quality criterion while neglecting time and bit consumption of such encoding. It is widely acknowledged that optimal encoding and re-encoding of video content, such as, e.g., video compression and recompression, to provide an optimal video encoding solution that is both efficient and cost-effective remains as a longstanding challenge in the field.

GENERAL DESCRIPTION

In accordance with certain aspects of the presently disclosed subject matter, there is provided a computerized method of video encoding optimization of an input video sequence, the input video sequence corresponding to a plurality of input frames, the method comprising: obtaining an input frame of the plurality of input frames; performing, by a video encoder, a first encoding of the input frame using a first encoding parameter determined in accordance with a target bit-rate, giving rise to a first encoded frame; performing, by the video encoder, a second encoding of the input frame using an iterative quality-driven encoding scheme initialized with an initial second encoding parameter, wherein the initial second encoding parameter is determined based on the first encoding parameter, the second encoding being performed in an attempt to seek a second encoded frame which has a lower bit-rate than the first encoded frame and meets a quality criterion with respect to the first encoded frame; and in case of the second encoded frame being found, providing the second encoded frame as an output frame corresponding to the input frame.

In addition to the above features, the method according to this aspect of the presently disclosed subject matter can comprise one or more of features (i) to (xix) listed below, in any desired combination or permutation which is technically possible:

(i). In case of the second encoded frame not being found, the first encoded frame can be provided as the output frame corresponding to the input frame.

(ii). The iterative quality-driven encoding scheme can employ a perceptual quality measure, and the quality criterion is set such that the second encoded frame is perceptually equivalent to the first encoded frame.

(iii). The initial second encoding parameter can be determined based on the first encoding parameter, and one or more previous second encoding parameters used for generating previous second encoded frames corresponding to previous input frames.

(iv). The second encoding of the input frame can be performed by reusing one or more encoding decisions used in the first encoding, the encoding decisions including at least one of the following: encoding mode, motion vector, block partitioning and prediction modes and encoding parameter per block within the input frame.

(v). The performing the second encoding of the input frame can comprise:
  1) encoding the input frame with the initial second encoding parameter, giving rise to a candidate encoded frame;
  2) computing a quality score of the candidate encoded frame using a quality measure applied to the candidate encoded frame relative to the first encoded frame;
  3) determining whether the quality score of the candidate encoded frame is above a quality threshold in the quality criterion, and if yes, storing the candidate encoded frame as a valid candidate encoded frame; and
  4) verifying if a termination condition is met, in case of the termination condition not being met, repeating the encoding of step 1) with an updated second encoding parameter and repeating steps 2) and 3) until the termination condition is met, and determining whether the second encoded frame is found.

(vi). Step 1) can further comprise: verifying whether bit-rate of the candidate encoded frame is lower than the first encoded frame, and if yes, continuing to perform step 2); otherwise, reverting to perform step 1) with an updated second encoding parameter.

(vii). Step 3) can further comprise, for the candidate encoded frame that has a quality score above the quality threshold, verifying whether bit-rate of the candidate encoded frame is lower than the first encoded frame, if yes, storing the candidate encoded frame as a valid candidate encoded frame.

(viii). The termination condition can include at least one condition selected from a group comprising: quality score of a candidate encoded frame falls within a tolerance range around the quality threshold, predetermined number of iterations is reached, encoding parameter options are exhausted, and potential gain in bit consumption of the second encoding is small.

(ix). The method can further comprise: prior to performing the first encoding, obtaining a video-encoder-state of the video encoder resulting from encoding of a previous input frame to enable the video encoder to perform the first encoding, and
after performing the first encoding, copying the video-encoder-state back to the video encoder to enable the video encoder to perform the second encoding of the input video frame.

(x). The method can further comprise: after performing the first encoding and each iteration of the second encoding, reserving the video-encoder-state to be used for encoding a subsequent frame.

(xi). The input video sequence can be an original uncompressed video sequence.

(xii). The input video sequence can be a compressed video stream corresponding the plurality of input frames.

(xiii). The input frame can be processed to extract one or more frame characteristics thereof to be used for configuring a quality measure used in the iterative quality-driven encoding scheme.

(xiv). The one or more frame characteristics can be indicative of content of the input frame and include at least one of the following: face, skin, edge, and scene type of the input frame.

(xv). The first encoded frame can be processed to extract one or more frame characteristics thereof to be used for configuring a quality measure used in the iterative quality-driven encoding scheme.

(xvi). The one or more frame characteristics can be indicative of content of the first encoded frame and include at least one of the following: intricateness, grain, chroma, smoothness, and texture of the first encoded frame.

(xvii). Bit consumption of the first encoded frame can be obtained to be used for configuring the first encoding of one or more subsequent input frames in the input video sequence.

(xviii). Bit consumption of the second encoded frame can be obtained to be used for configuring the first encoding of one or more subsequent input frames in the input video sequence.

(xix). The obtaining, the performing a first encoding, the performing a second encoding and the providing can be repeated for encoding the one or more subsequent input frames, and the first encoding of the one or more subsequent input frames can be configured according to the obtained bit consumption.

In accordance with other aspects of the presently disclosed subject matter, there is provided a computerized system of video encoding optimization of an input video sequence, the input video sequence corresponding to a plurality of input frames, the system comprising a processing circuitry that comprises a processor and a memory operatively coupled thereto, the processing circuitry configured to: obtain an input frame of the plurality of input frames; perform, by a video encoder, a first encoding of the input frame using a first encoding parameter determined in accordance with a target bit-rate, giving rise to a first encoded frame; perform, by the video encoder, a second encoding of the input frame using an iterative quality-driven encoding scheme initialized with an initial second encoding parameter, wherein the initial second encoding parameter is determined based on the first encoding parameter, the second encoding being performed in an attempt to seek a second encoded frame which has a lower bit-rate than the first encoded frame and meets a quality criterion with respect to the first encoded frame; and in case of the second encoded frame being found, provide the second encoded frame as an output frame corresponding to the input frame.

In accordance with other aspects of the presently disclosed subject matter, there is provided a non-transitory computer readable storage medium tangibly embodying a program of instructions executable by a processing device comprised in a computer to perform a method of video encoding optimization of an input video sequence, the input video sequence corresponding to a plurality of input frames, the method comprising the steps of the following: obtaining an input frame of the plurality of input frames; performing, by a video encoder, a first encoding of the input frame using a first encoding parameter determined in accordance with a target bit-rate, giving rise to a first encoded frame; performing, by the video encoder, a second encoding of the input frame using an iterative quality-driven encoding scheme initialized with an initial second encoding parameter, wherein the initial second encoding parameter is determined based on the first encoding parameter, the second encoding being performed in an attempt to seek a second encoded frame which has a lower bit-rate than the first encoded frame and meets a quality criterion with respect to the first encoded frame; and in case of the second encoded frame being found, providing the second encoded frame as an output frame corresponding to the input frame.

The computerized system, the non-transitory computer readable storage medium disclosed herein according to various aspects, can optionally further comprise one or more of features (i) to (xix) listed above, mutatis mutandis, in any technically possible combination or permutation.

BRIEF DESCRIPTION OF THE DRAWINGS

In order to understand the presently disclosed subject matter and to see how it may be carried out in practice, the subject matter will now be described, by way of non-limiting example only, with reference to the accompanying drawings, in which.

DETAILED DESCRIPTION

Figure 1:
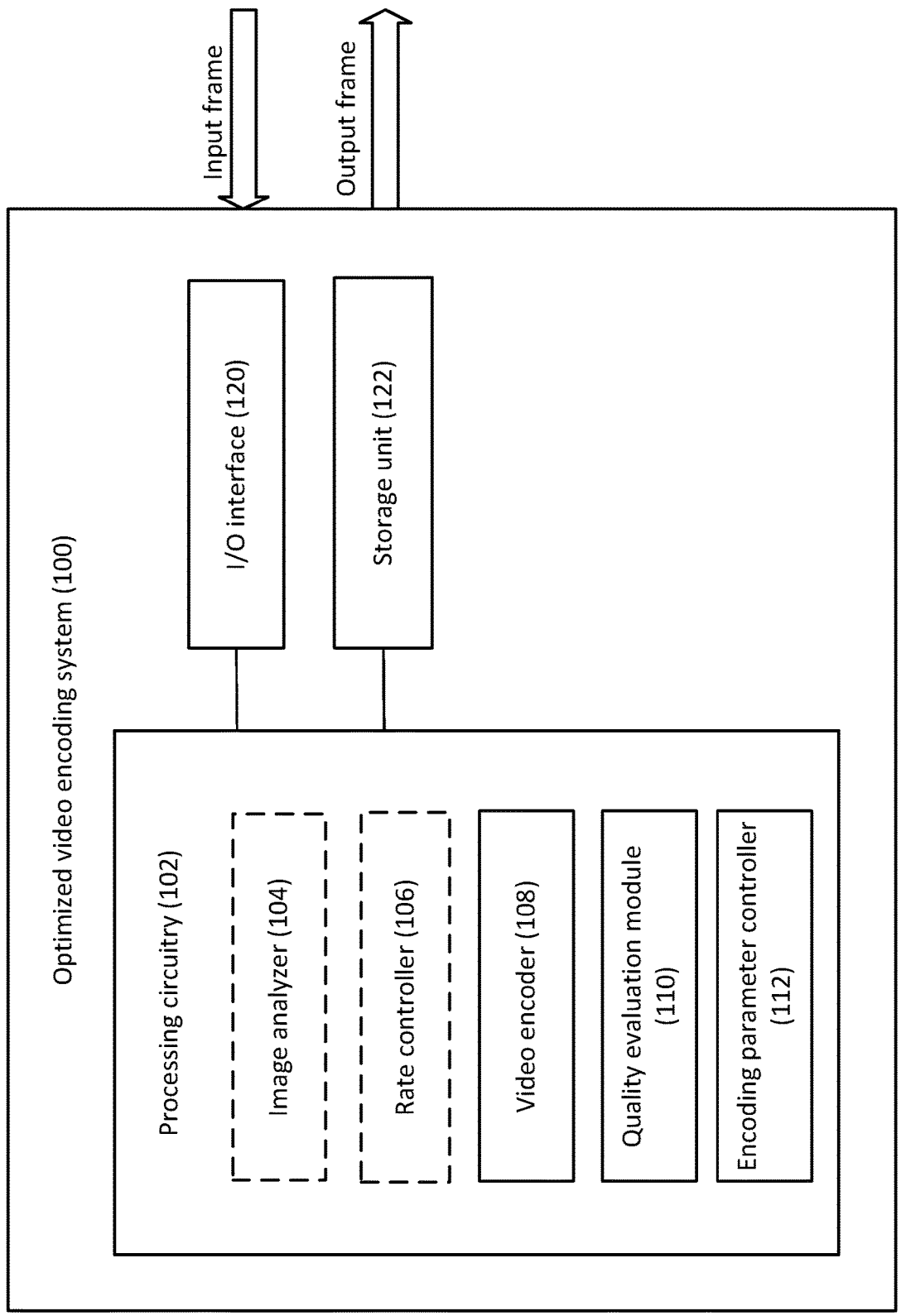
FIG. 1 is a functional block diagram schematically illustrating a computerized system of optimized video encoding in accordance with certain embodiments of the presently disclosed subject matter.

In the following detailed description, numerous specific details are set forth in order to provide a thorough understanding of the disclosed subject matter. However, it will be understood by those skilled in the art that the present disclosed subject matter can be practiced without these specific details. In other instances, well-known methods, procedures, and components have not been described in detail so as not to obscure the present disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "performing", "encoding", "re-encoding", "providing", "generating", "using", "re-using", "computing", "repeating", "determining", "verifying", "continuing", "reverting", "storing", "selecting", "copying", "configuring", or the like, include action and/or processes of a computer that manipulate and/or transform data into other data, said data represented as physical quantities, e.g. such as electronic quantities, and/or said data representing the physical objects. The term "computer" should be expansively construed to cover any kind of hardware-based electronic device with data processing capabilities, including, by way of non-limiting example, a personal computer, a server, a computing system, a communication device, any other electronic computing device, and or any combination thereof, such as, e.g., the computerized system of optimized video encoding disclosed in the present application.

The operations in accordance with the teachings herein can be performed by a computer specially constructed for the desired purposes or by a general purpose computer specially configured for the desired purpose by a computer program stored in a non-transitory computer readable storage medium.

The terms "non-transitory memory", "non-transitory storage medium" and "non-transitory computer readable storage medium" used herein should be expansively construed to cover any volatile or non-volatile computer memory suitable to the presently disclosed subject matter.

Embodiments of the presently disclosed subject matter are not described with reference to any particular programming language. It will be appreciated that a variety of programming languages may be used to implement the teachings of the presently disclosed subject matter as described herein.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

In embodiments of the presently disclosed subject matter one or more stages illustrated in the figures may be executed in a different order and/or one or more groups of stages may be executed simultaneously and vice versa.

Bearing this in mind, attention is now drawn to FIG. 1, schematically illustrating a functional block diagram of a system for optimized video encoding in accordance with certain embodiments of the presently disclosed subject matter.

According to certain embodiments, there is provided a computer-based system 100 for optimized video encoding of an input video sequence, the input video sequence corresponding to a plurality of input video frames (also termed as input frames or video frames). The term "video encoding" used in this patent specification should be expansively construed to cover any kind of video compression that converts raw (i.e., uncompressed) digital video to a compressed format, as well as video recompression that converts decoded or decompressed video to a re-encoded or recompressed format.

In certain embodiments, the input video sequence can refer to an original video sequence that is not encoded or compressed, such as, e.g., an original raw video clip or part thereof. Such video clip can comprise a plurality of original video frames, and can be obtained from, e.g., a digital camera or recorder, or any other suitable devices that are capable of capturing or recording individual still images or sequences of images constituting videos or movies.

In some other embodiments, the input video sequence can refer to an input video bit-stream which has been previously encoded using a video encoder (thus it can also be referred to as "encoded video bit-stream" or "compressed video bit-stream") and includes encoded data corresponding to one or more encoded video frames. In such cases, the input video bit-stream can be first decoded or reconstructed to a decoded video sequence prior to be further encoded using the present disclosure. In further embodiments, the input video sequence can comprise the decoded or reconstructed video sequence which was decoded from the encoded video bit-stream. Without limiting the scope of the disclosure in any way, it should be noted that the term "frame" used in the specification should be expansively construed to include a single video picture, frame, image, field, or slice of the input video sequence.

System 100 can comprise a processing circuitry 102 operatively connected to a hardware-based I/O interface 120 and a Storage unit 122. The system 100 may obtain, e.g., via I/O interface 120, an input frame of the input video sequence corresponding to a plurality of input frames. In some embodiments, the input video sequence or the input frame thereof can be received from a user, a third party provider or any other system that is communicatively connected with system 100. Alternatively or additionally, the input video sequence or the input frame thereof can be pre-stored in the Storage unit 122.

The processing circuitry 102 is configured to provide all processing necessary for operating system 100 which is further detailed with reference to FIG. 2. The processing circuitry 102 refers to hardware (e.g., an electronic circuit) within a computer that executes a program. The processing circuitry 102 can comprise a processor (not shown separately) and a memory (not shown separately). The processor of processing circuitry 102 can be configured to execute several functional modules in accordance with computer-readable instructions implemented on a non-transitory computer-readable memory comprised in the processing circuitry. Such functional modules are referred to hereinafter as comprised in the processing circuitry.

According to certain embodiments, functional modules comprised in the processor can include a Video encoder 108, a Quality evaluation module 110 and an Encoding parameter controller 112 which are operatively connected with each other. Video encoder 108 can be configured to perform a first encoding of the input frame using a first encoding parameter determined in accordance with a target bit-rate, giving rise to a first encoded frame. Video encoder 108 can be further configured to perform a second encoding of the input frame using an iterative quality-driven encoding scheme initialized with an initial second encoding parameter. The initial second encoding parameter can be determined based on the first encoding parameter. The second encoding is performed in an attempt to seek a second encoded frame which has a lower bit-rate than the first encoded frame and meets a quality criterion with respect to the first encoded frame. In case of the second encoded frame being found, system 100 can provide, e.g., via the I/O interface 120, the second encoded frame as an output frame corresponding to the input frame. In some embodiments, the first second encoding parameter can be determined by the Encoding parameter controller 112, as will be described below in details with reference to FIG. 2.

The iterative quality-driven encoding scheme used in the second encoding can comprise a quality evaluation process performed by a Quality evaluation module 110. In certain embodiments, the functionality of the Quality evaluation module 110, or at least part thereof, can be integrated within the system 100. By way of example, as illustrated in FIG. 1, the Quality evaluation module 110 can be comprised within the processing circuitry 102. Alternatively, in some other embodiments, the Quality evaluation module 110 can be implemented in a standalone computer that is operatively connected with the system 100. Thus in such cases system 100 can be configured to provide, through the I/O interface 120, an evaluation instruction to the Quality evaluation module 110 for quality evaluation in the second encoding process. The Quality evaluation module 110 can be configured to receive the evaluation instruction from the I/O interface 120 of system 100, evaluate quality of encoded frames as instructed and provide the evaluated quality as feedback to system 100.

According to certain embodiments, functional modules comprised in the processor can further include an Image analyzer 104 and/or a Rate controller 106 which are operatively connected with other functional modules. Image analyzer 104 can be configured to perform image processing of the input frame and/or the first encoded frame in order to extract one or more frame characteristics thereof to be used for configuring a quality measure used in the iterative quality-driven encoding scheme. Rate controller 106 can be configured to determine a first encoding parameter used in the first encoding process according to a target bit-rate. The functionalities of the Image analyzer 104 and Rate controller 106 will be further described below in details with reference to FIG. 2.

The Storage unit 122 comprises a non-transitory computer readable storage medium. For instance, the storage module can include a buffer that holds an input video sequence as well as an output video sequence. In another example, the buffer may also hold one or more of the intermediate results including: first encoded frame(s), candidate encoded frame(s), valid candidate encoded frame(s), second encoded frame(s), encoding instruction(s) and parameter(s), etc. According to certain embodiments, the Storage unit 122 can also comprise computer-readable instructions embodied therein to be executed by the processing circuitry 102 for implementing the process of optimized video encoding as described below with reference to FIG. 2.

Those versed in the art will readily appreciate that the teachings of the presently disclosed subject matter are not bound by the system illustrated in FIG. 1 and the above exemplified implementations. Equivalent and/or modified functionality can be consolidated or divided in another manner and can be implemented in any appropriate combination of software, firmware and hardware. By way of example, the functionalities of the Video encoder 108 as described herein can be divided and implemented as separate modules operatively connected thereto. For instance, such division can be in accordance with the first and second encoding processes, and/or in accordance with different stages within each encoding process. By way of another example, the Rate controller 106, the Quality evaluation module 110, and the Encoding parameter controller 112 can be either implemented individually and in connection with the Video encoder 108, or alternatively one or more of these modules can be integrated within the Video encoder 108. By way of yet another example, the functionalities of the Rate controller 106 and the Encoding parameter controller 112, or at least part thereof, can be implemented in a single module.

The system in FIG. 1 can be a standalone network entity, or integrated, fully or partly, with other network entities. Those skilled in the art will also readily appreciate that the data repositories or storage module therein can be shared with other systems or be provided by other systems, including third party equipment.

It is also noted that the system illustrated in FIG. 1 can be implemented in a distributed computing environment, in which the aforementioned functional modules shown in FIG. 1 can be distributed over several local and/or remote devices, and can be linked through a communication network.

Figure 2:
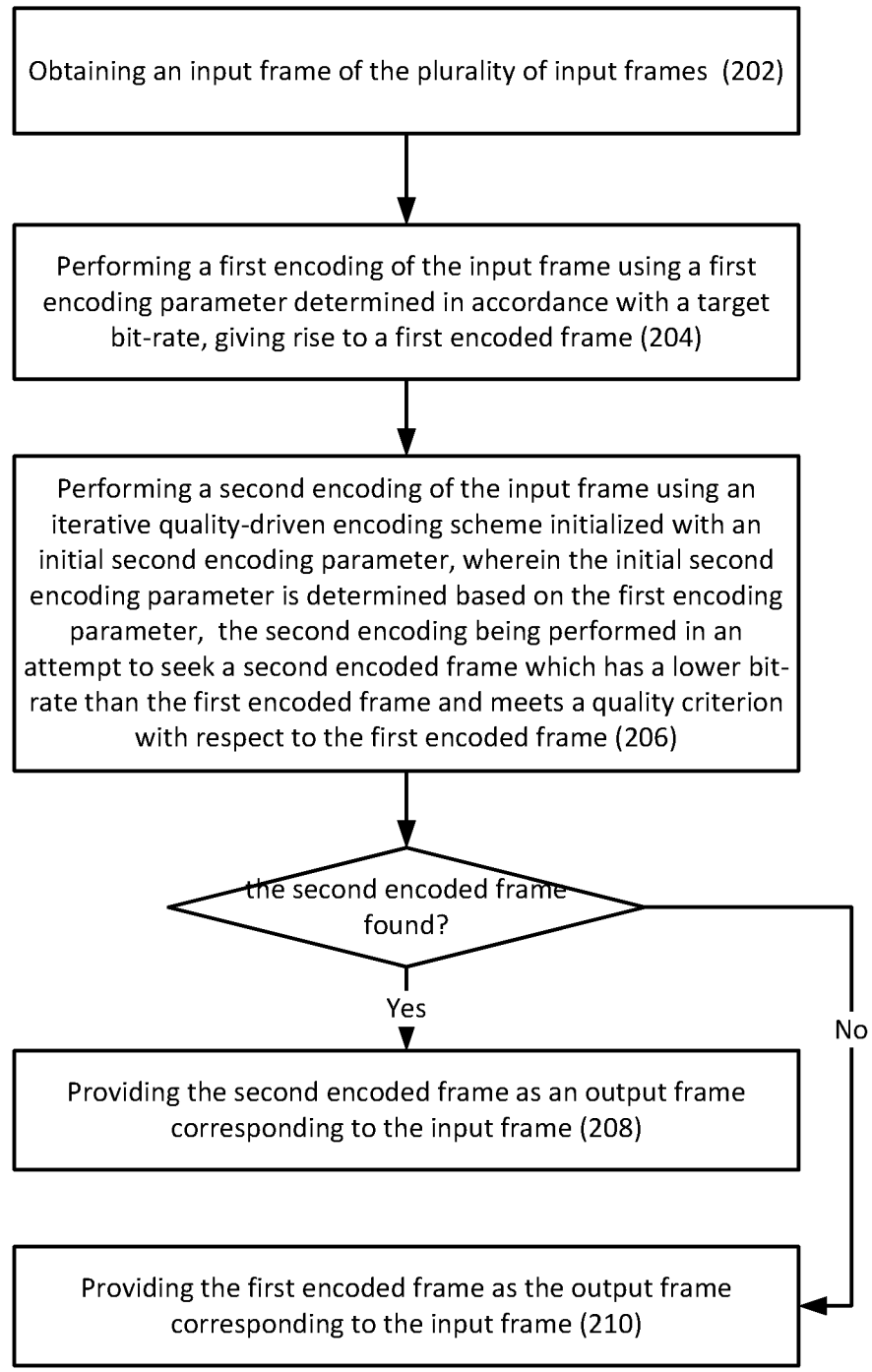
FIG. 2 is a generalized flowchart of optimized video encoding in accordance with certain embodiments of the presently disclosed subject matter.
Figure 3:
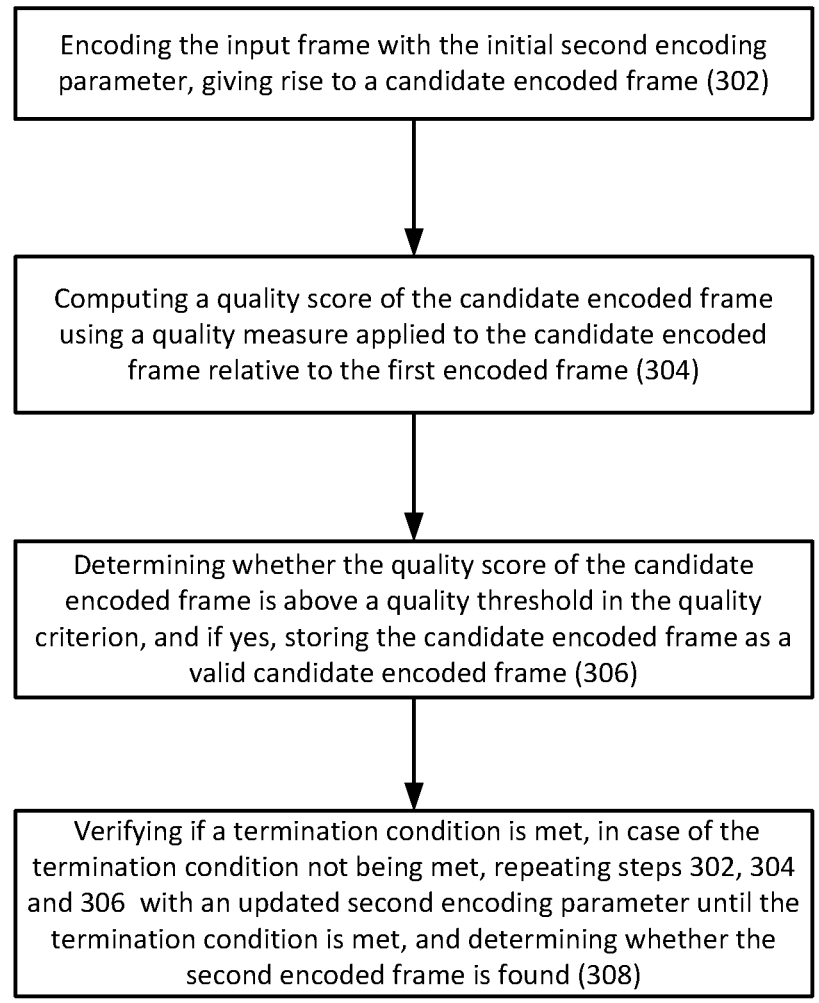
FIG. 3 is a generalized flowchart of a second encoding process using an iterative quality-driven encoding scheme in accordance with certain embodiments of the presently disclosed subject matter.
Figure 4:
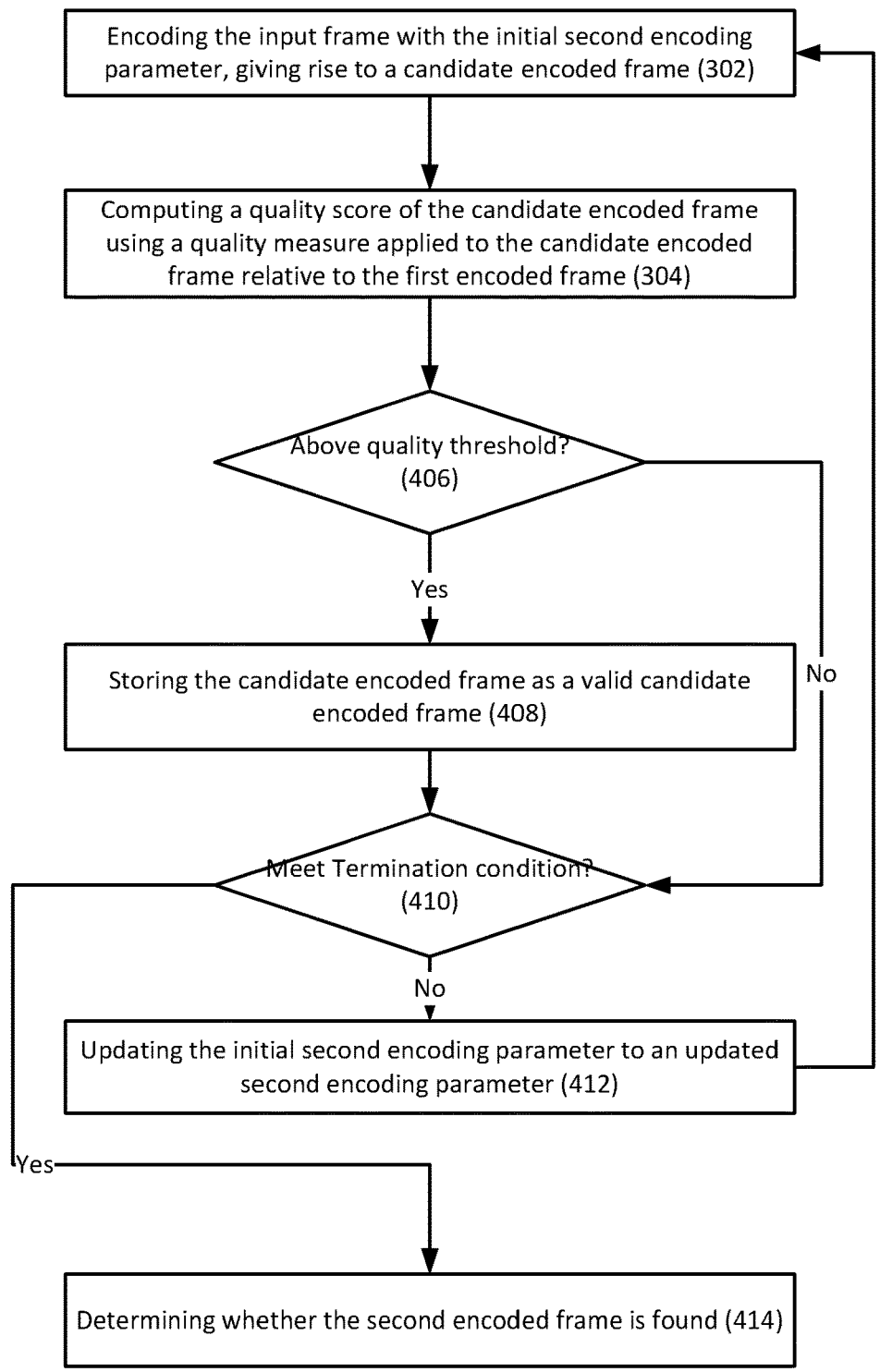
FIG. 4 is a generalized flowchart of a specific example of the second encoding process in accordance with certain embodiments of the presently disclosed subject matter.

While not necessarily so, the process of operation of system 100 can correspond to some or all of the stages of the methods described with respect to FIGS. 2-4. Likewise, the methods described with respect to FIGS. 2-4 and their possible implementations can be implemented by system 100. It is therefore noted that embodiments discussed in relation to the methods described with respect to FIGS. 2-4 can also be implemented, mutatis mutandis as various embodiments of the system 100, and vice versa.

Turning now to FIG. 2, there is shown a generalized flowchart of optimized video encoding of an input video sequence in accordance with certain embodiments of the presently disclosed subject matter.

An input frame of an input video sequence corresponding to a plurality of input frames can be obtained (202) (e.g., by the I/O interface 120 illustrated in FIG. 1). In some embodiments, the input video sequence or the input frame thereof can be received from a user, a third party provider or any other system that is communicatively connected with system 100. Alternatively or additionally, the input video sequence or the input frame thereof can be pre-stored in the Storage unit 122 and can be retrieved therefrom.

As aforementioned, the input video sequence can refer to an original video sequence that is not encoded or compressed. Alternatively it can comprise a previously encoded or compressed video bit-stream (e.g., a very high bit-rate or high quality video stream) which needs to be decoded prior to be further encoded in steps 204 and 206, or it can comprise the decoded video sequence which has been decoded from the encoded video bit-stream. Accordingly, the input frame can be an original video frame, or a decoded or reconstructed video frame.

A first encoding of the input frame can be performed (204) (e.g., by the Video encoder 108 illustrated in FIG. 1), using a first encoding parameter determined in accordance with a target bit-rate, giving rise to a first encoded frame.

According to certain embodiments, a target bit-rate can be predetermined, e.g., per request of the users or a system specification or an external specification. The target bit-rate can be associated with an output video sequence or video stream corresponding to the input video sequence. By way of example, the target bit-rate can be determined according to certain factors related to users' network and hardware configurations, etc., in order to deliver an optimal range of viewing experiences to users connecting with different devices over varying network bandwidths. A rate control algorithm can be used (e.g., by the Rate controller 106 illustrated in FIG. 1) to determine the first encoding parameter in order to achieve the target bit-rate. By way of example, the rate control algorithm can allocate a budget of bits to each frame (in some cases sub frame) of the input video sequence. Such bit allocation per frame can be determined taking into consideration of one or more of the following parameters including, for example: content of the frame, frame type, amount of motion, encoding mode, bit consumption of previous frames, content and/or types of upcoming frames using look-ahead, and any other known parameters that can be taken into consideration for bit allocation. The bit allocation per frame can then be used to configure the first encoding parameter. The configuration can take previous encoding parameters used for previous frames into consideration.

It is to be noted that the above described rate control algorithm is illustrated for exemplary purposes only and should by no means be deemed to limit the present disclosure in any way. Any other known rate control algorithms to convert a target bit-rate to encoding parameters can also be used in addition or in lieu of the above.

The term "encoding parameter" (EP) used herein should be construed to cover any of the following compression parameters: the quantizer or quantization parameter (QP), bit-rate parameter, a compression level indicating a preconfigured set of parameters in a given encoder, as well as various parameters which control encoding decisions such as, e.g., allowed or preferred prediction modes, Lagrange multiplier lambda value used in rate-distortion and partitioning decisions, deblocking filter configuration, delta QP values between areas in the frame or different image components etc. For convenience purposes, certain embodiments of the presently disclosed subject matter are described with reference to the QP. However, it should be noted that the examples provided herein with reference to the QP can also be applied to other types of encoding parameters.

Once the first encoding parameter (e.g., the first QP) is determined, the input frame can be encoded using the first QP, giving rise to a first encoded frame. It is to be noted that, except for using the encoding parameter in the first encoding of the input frame, certain encoding decisions also need to be made for performing the first encoding, these encoding decisions including (but not limited to) one or more of the following: encoding mode, motion vectors (including coarse motion vector and refined motion vector), block partitioning and prediction modes, and encoding parameter (e.g., QP and delta QP) per block or coding unit within the input frame etc.

Following the first encoding, a second encoding of the input frame can be performed (206) (e.g., by the Video encoder 108 illustrated in FIG. 1), using an iterative quality-driven encoding scheme initialized with an initial second encoding parameter. The initial second encoding parameter can be determined based on at least the first encoding parameter. The second encoding is performed in an attempt to seek a second encoded frame which has a lower bit-rate than the first encoded frame and meets a quality criterion with respect to the first encoded frame.

The term "quality criterion" is used herein to determine if quality of an encoded frame is sufficient. According to certain embodiments, the quality criterion can comprise two parameters: 1) a quality threshold which indicates the target quality (i.e., a target level of similarity); 2) a tolerance range which indicates the allowed deviation from the target quality. In some cases, the tolerance range can include an upper_tolerance—allowed delta above target quality, and a lower_tolerance—allowed delta below target quality.

The quality criterion relates to a computable quality measure which provides an indication of video content quality. Such a quality measure is applied to a target image or a video frame (which is received as input) whose quality needs to be evaluated (e.g., the second encoded frame, or a candidate encoded frame generated during the iteration process as described in the present disclosed subject matter), optionally with respect to or relative to a corresponding reference image or video frame (e.g., the first encoded frame as described in the present disclosed subject matter). Various quality metrics or quality measures can be used to calculate a quality score for the target frame. Good quality measures can provide quality scores that correlate well with subjective quality evaluation of the same content. Examples of quality measures that can be utilized herein include any of the following, or combinations thereof: Peak Signal to Noise Ratio (PSNR), Structural SIMilarity index (SSIM), Multi-Scale Structural SIMilarity index (MS-SSIM), Video Quality Metric (VQM), Visual information Fidelity (VIF), MOtion-based Video Integrity Evaluation (MOVIE), Perceptual Video Quality Measure (PVQM), quality measure using one or more of Added Artifactual Edges, texture distortion measure, and a combined quality measure combining inter-frame and intra-frame quality measures, such as described in U.S. Pat. No. 9,491,464 entitled "Controlling a video content system" issued on Nov. 8, 2016, which is incorporated herein in its entirety by reference, as will be described in further detail below.

One example of a quality measure which can be used in the iterative quality-driven encoding scheme is a perceptual quality measure. In such cases, the quality criterion can set forth a target perceptual quality, i.e., a target level of perceptual similarity, and the perceptual quality measure can be applied to an encoded frame to evaluate whether its visual appearance, relative to the input video frame that is used as input in the encoding process, is above (or below) the target level of perceptual similarity (i.e., whether a quality score which is calculated for the encoded frame is above or below a quality threshold value). In some cases, the quality criterion can include a requirement that an encoded frame is perceptually equivalent or identical to the corresponding input frame. In an example of the presently disclosed subject matter, the quality criterion can be set such that the second encoded frame is perceptually equivalent to the first encoded frame.

According to certain embodiments, the same quality criterion can be used for all video frames of an input video sequence. Alternatively, different quality criteria can be used for different frames. In the latter case, the quality criterion for a given frame can be manually set by an operator, or can be selected or computed. By way of example, the quality criterion for a given frame can be determined according to certain frame characteristics, such as, e.g., frame type, level of motion, its location in the video sequence etc. Further by way of example, a higher quality requirement may be used for the beginning frames of the video sequence. Still further by way of example, different quality criteria can be used according to system level behaviors, for instance, indications that certain frames are viewed by many users and therefore should be encoded using a higher target quality.

It is to be noted that the video encoder used herein can be any video encoder that can be configured according to the selected encoding parameters and followed by evaluation of the bit-rate and quality of the encoded frames.

Turning now to FIG. 3, there is shown a generalized flowchart of a second encoding process using an iterative quality-driven encoding scheme in accordance with certain embodiments of the presently disclosed subject matter.

The iterative quality-driven encoding process can start with encoding (302) the input frame with an initial second encoding parameter, giving rise to a candidate encoded frame. According to certain embodiments, the initial second encoding parameter can be determined based on the first encoding parameter. In some cases, the initial second encoding parameter can be determined based on the first encoding parameter and one or more previous second encoding parameters used for generating previous second encoded frames corresponding to previous input frames. The previous input frames can be selected to be the same frame type as the current input frame (e.g., in terms of I/P/B frames). By way of example, as a starting point of the second encoding, the initial second encoding parameter (i.e., initial second QP) can be determined based on the first encoding parameter (i.e., first QP) with a stepped modification. For instance, a delta QP can be added (or subtracted) from the first QP value that was used in the first encoding. In some embodiments, the delta QP can be determined based on a distance or a difference between one or more previous first and second encoding parameters.

For instance, if the first QP used in the first encoding is $QP_1=20$, and for a previous frame, the second QP for generating a previous second encoded frame is $QP_2\_Prev=26$, while for that frame the $QP_1\_Prev=22$, a delta QP can be determined based on the difference between $QP_1\_Prev$ and $QP_2\_Prev$ (e.g., in this case the delta QP=4) so the initial $QP_2=20+4=24$. A good starting point of the second QP (i.e., the initial second QP) can be determined based on the $QP_1$ and the delta QP. In one example, the initial $QP_2$ can be, e.g., $QP_1$+delta QP. In another example, the initial $QP_2$ can be, e.g., $QP_1$+max (1, delta QP). It is to be noted that the above described determining initial second QPs are by no means inclusive of all possible alternatives but are intended to illustrate non-limiting examples, and accordingly other ways of determining second QPs can be used in addition to or in lieu of the above.

To be able to select a good initial second QP based on the first QP used in the first encoding not only reduces the number of iterations required and hence reduces the overall processing time for the second encoding process, but also contributes in resulting in an encoded frame with a smaller size (i.e., having a lower bit-rate) than the first encoded frame.

In some embodiments, the second encoding of the input frame can be performed by reusing one or more encoding decisions used in the first encoding, the encoding decisions including at least one of the following: encoding mode, motion vectors (including coarse motion vector and optionally refined motion vector), block partitioning and prediction modes, and encoding parameter per block or coding unit within the input frame etc. One example of encoding parameter per block or coding unit can be a diff QP which is a difference between QP per block and the average or slice QP. These encoding decisions can be reused for part or all consecutive encoding iterations in the second encoding which may further increase the efficiency of the encoding process. In some cases, the extent or type of encoding decisions to be reused may be dependent on how different the initial second encoding parameter is from the first encoding parameter used to create the first encoded frame. It is also possible to reuse these encoding decisions between different iterations of the second encoding, for example reusing encoding decisions from an initial iteration of the second encoding to consecutive iterations of the second encoding.

Next, a quality score of the candidate encoded frame can be computed (304) using a quality measure applied to the candidate encoded frame relative to the first encoded frame. Various quality metrics or quality measures as described above can be used to calculate the quality score for the candidate encoded frame. According to certain embodiments, utilizing a combined quality measure combining inter-frame and intra-frame quality measures as aforementioned, the computation of the quality score for the candidate encoded frame can be based on an intra-frame quality score and an inter-frame quality score. By way of example, the intra-frame quality score can be computed using an intra-frame quality applied in the pixel-domain of the first encoded frame (i.e., the reconstructed frame decoded from the first encoded frame) and the candidate encoded frame (i.e., the reconstructed frame decoded from the candidate encoded frame). According to certain embodiments, the intra-frame quality score can optionally be associated with one or more of the following intra-wise quality measures: an added artifactual edges measure, a texture distortion measure, a pixel-wise difference measure and an edge loss measure.

The inter-frame quality score can be computed based on a first difference between the current first encoded frame and a preceding first encoded frame (i.e., the reconstructed frame decoded from the preceding first encoded frame), and a second difference between the current candidate encoded frame and a preceding second encoded frame (i.e., the reconstructed frame decoded from the preceding second encoded frame). The preceding second encoded frame is the second encoded frame which corresponds to the preceding input frame. By way of example, the inter-frame quality score can be computed based on a comparison of the first difference value and the second difference value, in order to evaluate a temporal consistency of the candidate encoded frame.

Based on the computed intra-frame quality score and inter-frame quality score, an overall frame quality score for a candidate encoded frame can be computed. According to certain embodiments, such a combined quality measure can enable the video encoder to provide a near maximal compression rate for a given input video frame while maintaining the overall relative perceptual quality of the respective encoded frame at a level that meets a desired quality criterion.

It is to be noted that further details of the above mentioned different quality measures for computing the frame quality score, including the computation of the intra-frame and inter-frame quality scores, as well as examples of each of the inter and intra components of the quality measure, are described in U.S. Pat. No. 9,491,464 entitled "Controlling a video content system" issued on Nov. 8, 2016, which is incorporated herein in its entirety by reference. It is also to be noted that the above described quality measures are by no means inclusive of all possible alternatives but are intended to illustrate non-limiting examples, and accordingly other quality measures can be used in addition to or in lieu of the above.

It is then determined (306) whether the quality score of the candidate encoded frame is above a quality threshold as comprised in the quality criterion. If the quality score is above the quality threshold, the candidate encoded frame can be stored as a valid candidate encoded frame. Next, it is verified if a termination condition is met, in case of the termination condition not being met, operations as described in blocks 302, 304 and 306 can be repeated (308) with an updated second encoding parameter until a termination condition is met, and it can be determined whether the second encoded frame is found.

According to certain embodiments, the termination condition can include at least one condition selected from a group comprising: quality score of a candidate encoded frame falls within a tolerance range around the quality threshold, predetermined number of iterations is reached, encoding parameter options are exhausted, and potential gain in bit consumption of the second encoding is small (e.g., smaller than a predetermined level). By way of example, a range or a set of candidate encoding parameters can be predetermined as encoding parameter options to be used in the iterative encoding process. The potential gain in bit consumption of the second encoding can be derived from the bit consumption of one or more candidate encoded frames as compared to the first encoded frame. The condition of predetermined number of iterations can be added in particular to impose a limit on the iterations for real-time oriented applications.

In some embodiments, the most common condition for termination is when the last iteration yields a candidate encoded frame with a quality score that is close enough to the target quality, i.e., the quality score falls within a tolerance range around the quality threshold. This is a preferred condition to terminate the iteration since a candidate encoded frame with a quality score that is close enough to the target quality is an ideal optimized encoded frame that has good enough quality (as being very close to the target quality) and also achieves sufficient bit savings. As for comparison, a candidate encoded frame which has a quality score above the upper tolerance of the tolerance range (thus above the target quality) is not an ideal optimized encoded frame since the quality is too high (higher than desired) thus leads to less bit savings.

However, there are difficult cases in which the iteration process does not easily converge to the target quality. For these cases, it is possible to use other termination conditions as listed above. Certain adjustments can also be made in such cases in order to assist in the convergence. For example, the quality threshold and tolerance range, although normally being predefined, can be slightly modified, as exemplified below:

In order to increase probability of the second encoding converging in the first iteration, or with a small number of iterations, it is possible to employ a scaling process to the allowed tolerance range, wherein the scaling factor is dependent on the iteration number.

When a large number of iterations is required, the upper tolerance can be gradually increased to assist convergence, which means a candidate frame with slightly higher quality is acceptable at the price of not maximizing savings.

The tolerance range can also be adjusted based on quality configurations. In order to avoid flicker at I frame which is not scene change, the quality threshold towards the end of previous GOP may be increased. This can be achieved by adapting the quality threshold of the last N frames in the GOP according to their distance from the end of the GOP.

A GOP can include one or more independently decodable video frames, which do not require any additional frames for decoding as they do not use reference frames in their coding process. This frame type is sometimes referred to as an "I-picture" (intra-coded picture) or an "I-frame". Typically, a GOP begins with an I-frame. Further by way of example, other types of frames which may be included in a GOP are: P-picture (predictive coded picture) or P-frame, which contains motion-compensated difference information from previously encoded I-frame(s) or P-frame(s); B-picture (bi-directionally predictive coded picture) or B-frame, which contains difference information from previously encoded I, P or B frames.

Referring now to FIG. 4, there is shown a generalized flowchart of a specific example of the second encoding process in accordance with certain embodiments of the presently disclosed subject matter.

Operations with reference to blocks 302, 304 are performed in a similar manner as described above in FIG. 3, therefore the relevant descriptions thereof are not repeated for the purpose of conciseness of the specification.

For the operations described above with reference to blocks 306 and 308, there is now provided a more specific example for implementing these operations. Specifically, when determining (306) whether the quality score of the candidate encoded frame is above a quality threshold (406), In the case of the quality score of the candidate encoded frame being above the quality threshold, the candidate encoded frame can be stored (408) in the storage unit as a valid candidate encoded frame. Otherwise, in the case that the quality score of the candidate encoded frame is not above the quality threshold (or after the valid candidate encoded frame is stored), the termination condition is verified (410). If the termination condition is not met, the initial second encoding parameter can be updated (412) to an updated second encoding parameter, and the process goes back to block 302 to continue with the iterative encoding process. If the termination condition is met, it can be determined (414) whether the second encoded frame is found. In some embodiments, one or more valid candidate encoded frames can be found upon the termination condition being met, and the determination (414) of whether the second encoded frame is found can comprise selecting one of the one or more valid candidate encoded frames to be the second encoded frame.

As described above, the ability to select a good initial second QP based on the first QP used in the first encoding can contribute in resulting in an encoded frame in the second encoding with a smaller size (i.e., having a lower bit-rate) than the first encoded frame, since the compression level of the first encoding is learnt (through the QP) when starting the second encoding. As a matter of fact, in many cases, a good starting point by itself can guarantee the encoded frames generated in the second encoding to have a lower bit-rate than the first encoded frame, especially when encoding decisions used in the first encoding are reused in the second encoding process.

However, due to the complex nature of image and video encoding, especially the fact that various encoding decisions are made within each encoding of an input frame, a good starting point itself sometimes cannot guarantee an encoded frame in the second encoding process to always have a lower bit-rate than the first encoded frame. Since the second encoding in the presently disclosed subject matter is performed in an attempt to seek a second encoded frame which not only needs to meet a quality criterion with respect to the first encoded frame, but also has to have a lower bit-rate than the first encoded frame. In order to ensure the lower bit-rate criterion is also met, the bit-rate of candidate encoded frames needs to be verified.

According to certain embodiments, the verification of bit-rate of the candidate encoded frames can be performed in different stages of the iteration process. By way of example, the verification can be performed in the stage of block 302, after the encoding of the input frame to a candidate encoded frame. Block 302 can further comprise verifying whether bit-rate of the candidate encoded frame is lower than the first encoded frame, and if yes, continuing to perform the operation of block 304. Otherwise if the bit-rate of the candidate encoded frame is not lower than the first encoded frame, the process reverts to block 302 directly, without performing any of the subsequent operations after block 302, and start the next iteration with an updated second encoding parameter.

By way of another example, the verification can alternatively be performed in the stage of block 306. Specifically, after the verification of the quality threshold as described in block 406, for the candidate encoded frame that has a quality score above the quality threshold, it can be verified whether bit-rate of the candidate encoded frame is lower than the first encoded frame. If yes, the operation of storing the candidate encoded frame as a valid candidate encoded frame can be performed as described in block 408. Otherwise, the candidate encoded frame is not stored, and the process continues with verifying the termination condition as described in block 410.

As described above, if one or more valid candidate encoded frames are found upon the termination condition being met, these valid candidate encoded frames meet both the quality criterion (i.e., with respect to the first encoded frame), as well as the bit-rate criterion (i.e., having a lower bit-rate than the first encoded frame). One of the one or more valid candidate encoded frames can be selected to be the second encoded frame. By way of example, the selection of the second encoded frame can be based on the bit-rate and/or the quality of the one or more valid candidate encoded frames. In one example, the valid candidate encoded frame that has a lowest bit-rate among all the valid candidate encoded frames can be selected. In another example, the valid candidate encoded frame that has a highest quality score among all the valid candidate encoded frames can be selected. In some cases, the valid candidate encoded frame that has a lowest bit-rate may happen to be the valid candidate encoded frame that has a highest quality score. In further examples, a balance or a trade-off between bit-rate and quality of different valid candidate encoded frames can be found, and the valid candidate encoded frame that meets the balance or trade-off can be selected.

As described above, in some cases, when the termination condition is met (e.g., predetermined number of iterations is reached, or encoding parameter options are exhausted), an ideal optimized encoded frame with a quality close enough to the target quality (i.e., within the tolerance range) might not always be obtainable. In such cases, the smallest valid candidate frame (i.e., the one has the lowest bit-rate), or the valid candidate frame encoded with the most aggressive encoding parameter(s), can be selected.

According to certain embodiments, in order to be able to repetitively re-encode the same input frame, state of the video encoder (also referred to as video-encoder-state or video encoder state) before the very first encoding of the input frame (which is also the state resulting from encoding of a previous input frame (i.e., the frame preceding the current input frame)) needs to be obtained in order to be used for any subsequent encoding and re-encoding of the same frame. A video encoder state used herein refers to all the buffers, data structures and parameter sets associated with the encoder which are related to the encoding process, including but not limited to the buffer of previous reconstructed pictures, video buffer status indicators, data structures holding various control and configuration parameters, such as, e.g., Lagrange multiplier lambda value used in rate-distortion decisions, settings of various encoding parameters, entropy encoder states and controlling parameters etc. A video encoder state can be accessed, for example, using a video-encoder-state access module (not illustrated) comprised in the processing circuitry 102. Obtaining the video encoder state can be performed, for example, by accessing the data structure which holds the encoder's state, or accessing a pointer to the data structure, as described in US patent publication No. 2014/0355668 entitled "Method and system for controlling video frame encoding" published on Dec. 4, 2014, which is incorporated herein in its entirety by reference.

Accordingly, prior to performing the first encoding, a video-encoder-state of the video encoder resulting from encoding of a previous input frame can be obtained to enable the video encoder to perform the first encoding of the current input frame. In some cases, the video-encoder-state can be reserved after encoding of the previous input video frame and copied back to the video encoder prior to the first encoding of the current input frame. Alternatively, the video-encoder-state can be just retrieved and reserved prior to the first encoding of the current input frame to be used for subsequent encoding of the same input frame. After performing the first encoding, the reserved video-encoder-state can be copied back to the video encoder to enable the video encoder to perform the second encoding of the input video frame. Copying a video encoder state can be performed, for example, by copying the data structure which holds the encoder state to another data structure of the same type, for which new memory is allocated.

In some embodiments, after performing the first encoding and each iteration of the second encoding, reserving the video-encoder-state to be used for encoding a subsequent frame of the input frame. This is performed due to the fact that at this stage it is still unknown which encoded frame will be selected to be the second encoded frame and which encoded frame will be the output frame corresponding to the input frame. Once the output frame is determined, as will be described below with reference to blocks 208 and 210, the video-encoder-state resulted from generating the output frame can be copied back to the video encoder to be used for encoding the subsequent frame. Examples and details of implementation of reserving a video-encoder-state for enabling iterative encoding of an input video frame by a video encoder are described in US patent publication No. 2014/0355668 entitled "Method and system for controlling video frame encoding" published on Dec. 4, 2014, which is incorporated herein in its entirety by reference.

According to certain embodiments, optionally, the input frame can be processed (e.g., by the Image analyzer 104 illustrated in FIG. 1) to extract one or more frame characteristics thereof to be used for configuring the quality measure used in the iterative quality-driven encoding scheme. The one or more frame characteristics to be extracted can be indicative of content of the input frame and can include at least one of the following characteristics: face, skin, edge, and scene type of the input frame. It is to be noted that any known or yet to be devised methods and algorithms for detecting and extracting these frame characteristics can be used for implementing such image processing operation.

According to certain embodiments, optionally, the first encoded frame can be processed (e.g., by the Image analyzer 104 illustrated in FIG. 1) to extract one or more frame characteristics thereof to be used for configuring a quality measure used in the iterative quality-driven encoding scheme. The one or more frame characteristics to be extracted can be indicative of content of the first encoded frame and can include at least one of the following characteristics: intricateness, grain, chroma, smoothness, and texture of the first encoded frame.

In one embodiment, an intricateness value for the first encoded frame can be calculated based on certain encoding information associated therewith. The intricateness value can be indicative of encoding difficulty of the first encoded frame in the encoding process. Examples of calculation of the intricateness value and usages thereof to configure a quality measure are described in PCT application entitled "Method and system of controlling a video content system" published on Aug. 4, 2016 under publication number WO 2016/120871, which is incorporated herein in its entirety by reference.

In a further embodiment, the presence of smooth areas in the first encoded image can be evaluated and quantified to configure the quality measure upon the presence of such areas, for improved compression or recompression control. A smoothness value indicative of an extent of smoothness of the first encoded frame or at least a portion thereof can be calculated. Additionally or alternatively, the presence of gradient areas (i.e., areas with colors or brightness that vary continuously with position, producing smooth transitions or slow gradual spatial change in shades or colors) in the first encoded image can be evaluated and quantified to configure the quality measure upon the presence of such areas, for improved compression or recompression control. A gradient value indicative of an extent of gradual spatial changes of the first encoded frame or at least a portion thereof can be calculated. Additionally or alternatively, the level of chroma artifacts introduced in the first encoded frame can be evaluated and quantified, by e.g., calculating a difference value indicative of an extent of difference between the input image and the first encoded frame, in order to configure the quality measure to obtain more perceptually reliable compression results. Examples of calculation of the smoothness value, the gradient value, the level of chroma artifacts and various usages thereof to configure a quality measure are described in PCT application entitled "Method and system of controlling a quality measure" published on Sep. 15, 2016 under publication number WO 2016/142931, which is incorporated herein in its entirety by reference.

In a further embodiment, an extent of texture distortion in the first encoded frame as compared to the corresponding input frame can be evaluated based on relations between texture values in the first encoded frame and the input frame. Examples of calculation of the texture values and usages thereof to configure a quality measure (e.g., to implement a texture distortion measure or to include it as a component of the quality measure) are described in U.S. Pat. No. 9,491,464 entitled "Controlling a video content system" issued on Nov. 8, 2016, which is incorporated herein in its entirety by reference.

It is appreciated to note that the input to the second encoding is the original input video frame, which is the same input as provided to the first encoding, and not a compressed version such as the first encoded frame. By using the original input video frame, less tandem encoding (i.e., consecutive encoding generations) is introduced thereby resulting in better encoding quality.

It is also to be noted that in the iterative process of the second encoding, the quality measure is applied to the candidate encoded frame relative to the first encoded frame, not relative to the input frame. This is particularly important for optimizing the video encoding process and providing the users with an optimized encoded frame that is quality-wise perceptually equivalent to the first encoded frame but has a smaller size and a lower bit-rate than the target bit-rate required by the users. This also offers reduced storage and encoding costs as well as bandwidth savings while delivering the same viewing experience to the users.

As compared to a single encoding of an input frame using an iterative quality-driven encoding process, the presently proposed method has the advantages of performing two direct encoding processes of the input frame, rather than two consecutive encoding generations when a first encoding generation is performed to a target bit-rate, and a second encoding generation is performed to optimize the video stream derived from the first encoding generation, and reducing bit-rate without compromising quality relative to the result of the first encoding process. In addition, by re-using information between the first encoding process and one or more iterations of the second encoding process, the proposed method offers higher efficiency and requires less computing power.

Turning back to FIG. 2 now, if the second encoded frame that meets both the bit-rate criterion (i.e., having a lower bit-rate than the first encoded frame) and the quality criterion with respect to the first encoded frame is found, the second encoded frame can be provided (210) as an output frame corresponding to the input frame. The output frame can be stored in the Storage unit 122. Additionally or alternatively, it can be transmitted, e.g., via the I/O interface 120, to a user, a third party provider or any other system that is communicatively connected with system 100.

In some embodiments, the second encoded frame may not be found after the iteration terminates. In such cases, the first encoded frame can be provided (212) as the output frame corresponding to the input frame. Alternatively, it is possible to perform a further encoding using a modified quality criterion, such as, e.g., a lower quality threshold. In another example, it is also possible to perform a further encoding in which different adjustments can be made to the encoding process—other than adjusting encoding parameters previously used to create the candidate encoded frames. For example, rather than modifying the QP, certain areas or coding units or macroblocks in the input frame can be selected to encode in SKIP mode (i.e., not to encode the selected areas). The encoded result under such mode can be selected as the output frame.

According to certain embodiments, bit consumption of the first encoded frame can be obtained to be used for configuring the first encoding of one or more subsequent input frames in the input video sequence. By way of example, the bit consumption of the first encoded frame can be calculated or counted and provided as feedback information to the Rate controller 106. The Rate controller 106 can configure the first encoding of the subsequent frames by obtaining or calculating first encoding parameters based on the obtained bit consumption and providing the first encoding parameters to the video encoder for the first encoding of one or more subsequent input frames. Providing such feedback to the Rate controller can leads to a bit-rate saving mode: i.e., an output video stream having a lower bit-rate than the target bit-rate, which is enabled by the second encoding which encodes the input frames to a quality equivalent to the quality obtained at the target bit-rate, but further compress the frames where possible to obtain a lower actual bitrate.

According to further embodiments, bit consumption of the second encoded frame can be obtained to be used for configuring the first encoding of one or more subsequent input frames in the input video sequence. By way of example, the bit consumption of the second encoded frame can be calculated or counted and provided as feedback information to the Rate controller 106. The Rate controller 106 can configure the first encoding of the subsequent frames by obtaining or calculating first encoding parameters based on the obtained bit consumption and providing the first encoding parameters to the video encoder for the first encoding of one or more subsequent input frames. Since it is expected that the size of the second encoded frame will be less than or equal to the size of the first encoded frame (i.e., having a lower bit-rate), providing such feedback to the Rate controller can leads to a quality improvement mode, by adjusting the first encoding parameter (e.g., decreasing the first QP) of subsequent input frames (i.e., increasing quality of the first encoded frame which is used as reference for the second encoding) thereby increasing encoded quality for subsequent input frames. In such mode each video clip or sequence is encoded to a specified target bit-rate while using the quality measure to allocate the bits between frames and across each frame in an optimal manner.

According to certain embodiments, the obtaining, the performing a first encoding, the performing a second encoding and the providing as described in blocks 202, 204, 206 and 208 can be repeated for encoding one or more subsequent input frames in the input video sequence, and the first encoding of the one or more subsequent input frames can be performed using the obtained bit consumption. In some embodiments, the obtaining, the performing a first encoding, the performing a second encoding and the providing can be repeated for each input frame in the video sequence, giving rise to an output video sequence or video stream comprising one or more output frames each corresponding to an input frame.

As described above with reference to block 308, in case of the termination condition not being met, operations as described in blocks 302, 304 and 306 can be repeated with an updated second encoding parameter until a termination condition is met. According to certain embodiments, the updated second encoding parameter can be based on the value used in a previous iteration with a stepped modification, for example a delta QP can be added (or subtracted) from the encoding parameter value that was used in a previous iteration.

For each consecutive iteration, update of the second encoding parameter may be done using a modified bisection search, i.e. bisection with a cap on maximal step size (i.e., the difference between two second QPs (i.e., $QP_2$)) between two consecutive iterations. This is used to search for the 'best' QP value in a range of [QPmin, QPmax]. QPmin refers to minimum allowed QP value for generating the second encoded frame. QPmax refers to maximum allowed QP value for generating the second encoded frame.

Note that there are global maximal and minimal allowed QP values (QPmaxG and QPminG) which are defined externally, and are constant throughout the video sequence, for instance, 10 and 51. There is an additional, 'a-priori' per frame QPmax value, which is constrained as described below and is smaller than or equal to the 'absolute' maximum QP. The 'a-priori' per frame minimum QP is set to $QP_1$ (i.e., the first QP used to generate the first encoded frame)+1.

At the end of each iteration, the frame minimum and maximum QP (i.e., QPmin and QPmax) may be updated according to the previous iteration(s) results. For instance, if a quality above the threshold is reached at a certain QP, that QP may become the QPmin value for following iterations of the frame, since there is no need to go any lower to obtain target quality (with the assumption that encoding quality is monotonous vs. QP).

For iteration n+1, $QP_2(n+1)$ is set according to the result of the current iteration which used $QP_2(n)$. $QP_2(n+1)$ is increased if quality frame encoded with $QP_2(n)$ is above quality threshold+upper tolerance, or decreased if quality is below quality threshold—lower tolerance. The new QP value ($QP_2(n+1)$) is found using bi-section search in the allowed value range, but the deviation delta QP from current candidate value ($QP_2(n)$) is clipped to step_size.

There is now described how step_size is set and updated.

For the first frame of the video sequence, step_size is initialized to a default value, for example 2, unless the input frame is small (such as <10,000 bytes) in which case it will be initialized to maximum value.

Once the search has completed and an appropriate QP value has been found, the step size for the next frame is updated as follows:

If the selected second candidate frame is associated with either the initial $QP_2$ value or to the value which is step_size away from it, this is assumed to be a 'good' working point and there is no need to change anything. Otherwise, If the second candidate frame is associated with a $QP_2$ value which is more than step_size above or below initial $QP_2$ value for the frame, current step_size may be too small. So a counter can be increased and when that counter exceeds a threshold, the step_size is increased. The counter is initialized to zero, and reset either after step_size decreases, or if selected $QP_2$ equals initial $QP_2$. Otherwise, if more than two iterations are required, decrease step_size may be decreased and the counter may be reset. After modification of step size it is clipped. so that it lies in the allowed range.

It is noted that the step size is not updated at the end of an I frame, or at the end of a frame where $QP_1$ was selected, but the counter still may be reset at the end of such frames when selected $QP_2$ value is equal to initial $QP_2$.

Some additional measures are taken to avoid a large number of iterations in problematic cases:

If the initial $QP_2$ for the frame=QPmaxG, and target quality on the first attempt is not reached, set step size for this frame only to maximum step size. This generally implies that it is leaving a 'static' scene, and it is needed to go quite far to find the right QP value.

For the fourth iteration and onwards—set step size for this frame only to maximum step size. Note, that if the target value is already bracketed (i.e., the values below and above the target have already been found), a regular bi-section will be performed so the maximum step size loses its meaning. The step size change will therefore kick in only if after three iterations it is still not in the right range of values.

To decrease number of iterations when it is suspected that a 'much' higher QP value is appropriate for the current frame than the initial QP value, if the score at the initial QP is 'far enough' above the target range (e.g., 0.15 above the threshold), then in the second iteration, quality for the maximum allowed QP value will be checked. If it is still above the range, the iteration is finished, otherwise revert back to the regular bisection based search.

It is worth noting that the need for constraint on maximum QP, or QP deviation from $QP_1$ and previous $QP_2$ is due somewhat to the fact that it is impossible to go back—i.e. if it went too far with a frame, and created a problem for future frames which use it as reference—this decision cannot be retracted when a problem is encountered in a 'future' encoded frame.

Having described the process as illustrated in FIG. 2, it is noted that in some cases, after performing the first encoding, it can be determined whether it is needed to perform the second encoding of the input frame. For example, if the first encoded frame consumes below a minimum number of bits, there is no need to perform further encoding and optimization. The first encoded frame can be decided to be the output frame for the input frame.

Those versed in the art will readily appreciate that the examples illustrated with reference to FIGS. 2-4 are by no means inclusive of all possible alternatives but are intended to illustrate non-limiting examples, and accordingly other ways of implementation can be used in addition to or in lieu of the above.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a non-transitory computer-readable memory or storage medium tangibly embodying a program of instructions executable by the computer for executing the disclosed method.

The computer readable storage medium causing a computer to carry out aspects of the present invention can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

The invention claimed is:

1. A computerized method of optimized video encoding of an input video sequence, the input video sequence corresponding to a plurality of input frames, the method comprising:
    obtaining an input frame of the plurality of input frames;
    performing, by a video encoder, a first encoding of the input frame using a first encoding parameter determined in accordance with a target bit-rate, giving rise to a first encoded frame;
    always performing, by the video encoder, a second encoding of the input frame, the second encoding being performed directly on the input frame as provided to the first encoding and not being performed on the first encoded frame, the second encoding being performed using an iterative quality-driven encoding scheme initialized with an initial second encoding parameter, wherein the initial second encoding parameter is selected based on the first encoding parameter to always obtain a lower bit-rate in a second encoded frame relative to the first encoded frame, the second encoding being performed in an attempt to seek the second encoded frame which has a lower bit-rate than the first encoded frame and meets a quality criterion with respect to the first encoded frame, wherein the meeting a quality criterion is determined by computing a quality score of the second encoded frame using a quality measure applied to and measuring quality of the second encoded frame relative to the first encoded frame, and determining whether the quality score is above a quality threshold in the quality criterion; and
    in case of the second encoded frame being found, providing the second encoded frame as an output frame corresponding to the input frame.

2. The computerized method according to claim 1, wherein in case of the second encoded frame not being found, providing the first encoded frame as the output frame corresponding to the input frame.

3. The computerized method according to claim 1, wherein the iterative quality-driven encoding scheme employs a perceptual quality measure, and the quality criterion is set such that the second encoded frame is perceptually equivalent to the first encoded frame.

4. The computerized method according to claim 1, wherein the initial second encoding parameter is determined based on the first encoding parameter, and one or more previous second encoding parameters used for generating previous second encoded frames corresponding to previous input frames.

5. The computerized method according to claim 1, wherein the second encoding of the input frame is performed by reusing one or more encoding decisions used in the first encoding, the encoding decisions including at least one of the following: encoding mode, motion vector, block partitioning and prediction modes and encoding parameter per block within the input frame.

6. The computerized method according to claim 1, wherein the performing the second encoding of the input frame comprises:
    i) encoding the input frame with the initial second encoding parameter, giving rise to a candidate encoded frame;
    ii) computing a quality score of the candidate encoded frame using a quality measure applied to the candidate encoded frame relative to the first encoded frame;
    iii) determining whether the quality score of the candidate encoded frame is above a quality threshold in the quality criterion, and if yes, storing the candidate encoded frame as a valid candidate encoded frame; and
    iv) verifying if a termination condition is met, in case of the termination condition not being met, repeating the encoding of step i) with an updated second encoding parameter and repeating steps ii) and iii) until the termination condition is met, and determining whether the second encoded frame is found.

7. The computerized method according to claim 6, wherein step i) further comprises: verifying whether bit-rate of the candidate encoded frame is lower than the first encoded frame, and if yes, continuing to perform step ii); otherwise, reverting to perform step i) with an updated second encoding parameter.

8. The computerized method according to claim 6, wherein step iii) further comprises, for the candidate encoded frame that has a quality score above the quality threshold, verifying whether bit-rate of the candidate encoded frame is lower than the first encoded frame, if yes, storing the candidate encoded frame as a valid candidate encoded frame.

9. The computerized method according to claim 6, wherein the termination condition includes at least one condition selected from a group comprising: quality score of a candidate encoded frame falls within a tolerance range around the quality threshold, predetermined number of iterations is reached, encoding parameter options are exhausted, and potential gain in bit consumption of the second encoding is small.

10. The computerized method according to claim 1, further comprising:
   prior to performing the first encoding, obtaining a video-encoder-state of the video encoder resulting from encoding of a previous input frame to enable the video encoder to perform the first encoding, and
   after performing the first encoding, copying the video-encoder-state back to the video encoder to enable the video encoder to perform the second encoding of the input video frame.

11. The computerized method according to claim 1, further comprising: after performing the first encoding and each iteration of the second encoding, reserving the video-encoder-state to be used for encoding a subsequent frame.

12. The computerized method according to claim 1, wherein the input video sequence is an original uncompressed video sequence.

13. The computerized method according to claim 1, wherein the input video sequence is a compressed video stream corresponding the plurality of input frames.

14. The computerized method according to claim 1, wherein the input frame is processed to extract one or more frame characteristics thereof to be used for configuring a quality measure used in the iterative quality-driven encoding scheme.

15. The computerized method according to claim 14, wherein the one or more frame characteristics are indicative of content of the input frame and include at least one of the following: face, skin, edge, and scene type of the input frame.

16. The computerized method according to claim 1, wherein the first encoded frame is processed to extract one or more frame characteristics thereof to be used for configuring a quality measure used in the iterative quality-driven encoding scheme.

17. The computerized method according to claim 16, wherein the one or more frame characteristics are indicative of content of the first encoded frame and include at least one of the following: intricateness, grain, chroma, smoothness, and texture of the first encoded frame.

18. The computerized method according to claim 1, further comprising obtaining bit consumption of the first encoded frame to be used for configuring the first encoding of one or more subsequent input frames in the input video sequence.

19. The computerized method according to claim 1, further comprising obtaining bit consumption of the second encoded frame to be used for configuring the first encoding of one or more subsequent input frames in the input video sequence.

20. The computerized method according to claim 18, further comprising: repeating the obtaining, the performing a first encoding, the performing a second encoding and the providing for encoding the one or more subsequent input frames, wherein the first encoding of the one or more subsequent input frames is configured according to the obtained bit consumption.

21. A computerized system of optimized video encoding of an input video sequence, the input video sequence corresponding to a plurality of input frames, the system comprising a processing circuitry that comprises a processor and a memory operatively coupled thereto, the processing circuitry configured to:
   obtain an input frame of the plurality of input frames;
   perform, by a video encoder, a first encoding of the input frame using a first encoding parameter determined in accordance with a target bit-rate, giving rise to a first encoded frame;
   always perform, by the video encoder, a second encoding of the input frame, the second encoding being performed directly on the input frame as provided to the first encoding and not being performed on the first encoded frame, the second encoding being performed using an iterative quality-driven encoding scheme initialized with an initial second encoding parameter, wherein the initial second encoding parameter is selected based on the first encoding parameter to always obtain a lower bit-rate in a second encoded frame relative to the first encoded frame, the second encoding being performed in an attempt to seek the second encoded frame which has a lower bit-rate than the first encoded frame and meets a quality criterion with respect to the first encoded frame, wherein the meeting a quality criterion is determined by computing a quality score of the second encoded frame using a quality measure applied to and measuring quality of the second encoded frame relative to the first encoded frame, and determining whether the quality score is above a quality threshold in the quality criterion; and
   in case of the second encoded frame being found, provide the second encoded frame as an output frame corresponding to the input frame.

22. The computerized system according to claim 21, wherein in case of the second encoded frame not being found, the processing circuitry is configured to provide the first encoded frame as the output frame corresponding to the input frame.

23. The computerized system according to claim 21, wherein the iterative quality-driven encoding scheme employs a perceptual quality measure, and the quality criterion is set such that the second encoded frame is perceptually equivalent to the first encoded frame.

24. The computerized system according to claim 21, wherein the initial second encoding parameter is determined based on the first encoding parameter, and one or more previous second encoding parameters used for generating previous second encoded frames corresponding to previous input frames.

25. The computerized system according to claim 21, wherein the second encoding of the input frame is performed by reusing one or more encoding decisions used in the first encoding, the encoding decisions including at least one of the following: encoding mode, motion vector, block partitioning and prediction modes and encoding parameter per block within the input frame.

26. The computerized system according to claim 21, wherein the processing circuitry is configured to perform the second encoding of the input frame comprising:
   i) encoding the input frame with the initial second encoding parameter, giving rise to a candidate encoded frame;
   ii) computing a quality score of the candidate encoded frame using a quality measure applied to the candidate encoded frame relative to the first encoded frame;
   iii) determining whether the quality score of the candidate encoded frame is above a quality threshold in the quality criterion, and if yes, storing the candidate encoded frame as a valid candidate encoded frame; and iv) verifying if a termination condition is met, in case of the termination condition not being met, repeating the encoding of step i) with an updated second encoding parameter and repeating steps ii) and iii) until the termination condition is met, and determining whether the second encoded frame is found.

27. The computerized system according to claim 26, wherein step i) further comprises: verifying whether bit-rate of the candidate encoded frame is lower than the first encoded frame, and if yes, continuing to perform step ii); otherwise, reverting to perform step i) with an updated second encoding parameter.

28. The computerized system according to claim 26, wherein step iii) further comprises, for the candidate encoded frame that has a quality score above the quality threshold, verifying whether bit-rate of the candidate encoded frame is lower than the first encoded frame, if yes, storing the candidate encoded frame as a valid candidate encoded frame.

29. The computerized system according to claim 26, wherein the termination condition includes at least one condition selected from a group comprising: quality score of a candidate encoded frame falls within a tolerance range around the quality threshold, predetermined number of iterations is reached, encoding parameter options are exhausted, and potential gain in bit consumption of the second encoding is small.

30. The computerized system according to claim 21, wherein the processing circuitry is further configured to:
prior to performing the first encoding, obtain a video-encoder-state of the video encoder resulting from encoding of a previous input frame to enable the video encoder to perform the first encoding, and
after performing the first encoding, copy the video-encoder-state back to the video encoder to enable the video encoder to perform the second encoding of the input video frame.

31. The computerized system according to claim 21, wherein the processing circuitry is further configured to: after performing the first encoding and each iteration of the second encoding, reserve the video-encoder-state to be used for encoding a subsequent frame.

32. The computerized system according to claim 21, wherein the input video sequence is an original uncompressed video sequence.

33. The computerized system according to claim 21, wherein the input video sequence is a compressed video stream corresponding the plurality of input frames.

34. The computerized system according to claim 21, wherein the input frame is processed to extract one or more frame characteristics thereof to be used for configuring a quality measure used in the iterative quality-driven encoding scheme.

35. The computerized system according to claim 34, wherein the one or more frame characteristics are indicative of content of the input frame and include at least one of the following: face, skin, edge, and scene type of the input frame.

36. The computerized system according to claim 21, wherein the first encoded frame is processed to extract one or more frame characteristics thereof to be used for configuring a quality measure used in the iterative quality-driven encoding scheme.

37. The computerized system according to claim 36, wherein the one or more frame characteristics are indicative of content of the first encoded frame and include at least one of the following: intricateness, grain, chroma, smoothness, and texture of the first encoded frame.

38. The computerized system according to claim 21, wherein the processing circuitry is further configured to obtain bit consumption of the first encoded frame to be used for configuring the first encoding of a subsequent input frame in the input video sequence.

39. The computerized system according to claim 21, wherein the processing circuitry is further configured to obtain bit consumption of the second encoded frame to be used for configuring the first encoding of a subsequent input frame in the input video sequence.

40. The computerized system according to claim 38, wherein the processing circuitry is further configured to repeat the obtaining, the performing a first encoding, the performing a second encoding and the providing for encoding the one or more subsequent input frames, wherein the first encoding of the one or more subsequent input frames is configured according to the obtained bit consumption.

41. A non-transitory computer readable storage medium tangibly embodying a program of instructions that, when executed by a computer, cause the computer to perform a method of optimized video encoding of an input video sequence, the input video sequence corresponding to a plurality of input frames, the method comprising:
obtaining an input frame of the plurality of input frames;
performing, by a video encoder, a first encoding of the input frame using a first encoding parameter determined in accordance with a target bit-rate, giving rise to a first encoded frame;
always performing, by the video encoder, a second encoding of the input frame, the second encoding being performed directly on the input frame as provided to the first encoding and not being performed on the first encoded frame, the second encoding being performed using an iterative quality-driven encoding scheme initialized with an initial second encoding parameter, wherein the initial second encoding parameter is selected based on the first encoding parameter to always obtain a lower bit-rate in a second encoded frame relative to the first encoded frame, the second encoding being performed in an attempt to seek the second encoded frame which has a lower bit-rate than the first encoded frame and meets a quality criterion with respect to the first encoded frame, wherein the meeting a quality criterion is determined by computing a quality score of the second encoded frame using a quality measure applied to and measuring quality of the second encoded frame relative to the first encoded frame, and determining whether the quality score is above a quality threshold in the quality criterion; and
in case of the second encoded frame being found, providing the second encoded frame as an output frame corresponding to the input frame.

* * * * *